US010247896B2

(12) United States Patent
Kerry et al.

(10) Patent No.: US 10,247,896 B2
(45) Date of Patent: Apr. 2, 2019

(54) OPTICAL FIBER APPARATUS

(75) Inventors: Matthew John Kerry, London (GB);
John Kerry, London (GB); Philip Alfred Barker, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 13/637,613

(22) PCT Filed: Mar. 25, 2011

(86) PCT No.: PCT/GB2011/000432
§ 371 (c)(1),
(2), (4) Date: Sep. 26, 2012

(87) PCT Pub. No.: WO2011/117588
PCT Pub. Date: Sep. 29, 2011

(65) Prior Publication Data
US 2013/0011110 A1    Jan. 10, 2013

(30) Foreign Application Priority Data

Mar. 26, 2010  (EP) .................................... 10250611

(51) Int. Cl.
*G02B 6/44*  (2006.01)
(52) U.S. Cl.
CPC ................. *G02B 6/4455* (2013.01)
(58) Field of Classification Search
None
See application file for complete search history.

(56) References Cited

U.S. PATENT DOCUMENTS

| 3,814,935 A | 6/1974 | Kissel |
| 4,357,918 A | 11/1982 | Asano |
| 4,471,651 A | 9/1984 | Dimeff et al. |
| 4,850,569 A | 7/1989 | Griffieon et al. |
| 4,856,937 A | 8/1989 | Grocott et al. |

(Continued)

FOREIGN PATENT DOCUMENTS

| DE | 4202147 | 7/1993 |
| DE | 19649556 | 6/1998 |

(Continued)

OTHER PUBLICATIONS

IEEE Guide for the Design and Installation of Cable Systems in Substations. Apr. 2008. 132 pages.

(Continued)

*Primary Examiner* — Chris H Chu
(74) *Attorney, Agent, or Firm* — Amy M. Salmela; Patterson Thuente Pedersen, P.A.

(57) ABSTRACT

Embodiments of an optical fiber splice tray assembly for attachment to a backplane are disclosed. In an embodiment, an optical fiber splice tray assembly includes a primary tray having a primary tray base, fiber retention means for retaining optical fiber against the primary tray base, fiber splice accommodation means, first attachment means for attaching the primary tray to the backplane, and second attachment means for attaching a secondary tray having a secondary tray base, to the primary tray, wherein the secondary tray is attached indirectly to the backplane via the primary tray using the second attachment means.

7 Claims, 2 Drawing Sheets

(56) References Cited

U.S. PATENT DOCUMENTS

| | | | |
|---|---|---|---|
| 4,880,484 A | 11/1989 | Obermeier et al. | |
| 4,948,219 A | 8/1990 | Seino et al. | |
| 5,002,090 A | 3/1991 | Ichikawa et al. | |
| 5,109,598 A | 5/1992 | Koch | |
| 5,121,644 A | 6/1992 | Grey et al. | |
| 5,143,353 A | 9/1992 | Sano et al. | |
| 5,199,689 A | 4/1993 | Proud et al. | |
| 5,211,377 A | 5/1993 | Griffioen et al. | |
| 5,248,128 A | 9/1993 | Warren et al. | |
| 5,467,968 A | 11/1995 | Proud et al. | |
| 5,699,996 A | 12/1997 | Boyle et al. | |
| 5,813,658 A | 9/1998 | Kaminski et al. | |
| 5,835,657 A | 11/1998 | Suarez et al. | |
| 5,953,475 A | 9/1999 | Beier et al. | |
| 6,129,341 A | 10/2000 | Griffioen et al. | |
| 6,192,180 B1* | 2/2001 | Kim et al. | 385/135 |
| 6,311,953 B1 | 11/2001 | Lang et al. | |
| 6,328,283 B1 | 12/2001 | Reeve et al. | |
| 6,364,290 B1 | 4/2002 | Barker | |
| 6,370,753 B1 | 4/2002 | Washburn | |
| 6,418,264 B1 | 7/2002 | Hough et al. | |
| 6,480,635 B1 | 11/2002 | Russell et al. | |
| 6,631,884 B2 | 10/2003 | Griffioen et al. | |
| 6,694,085 B2 | 2/2004 | Bergqvist et al. | |
| 6,937,033 B2 | 8/2005 | Boronkay et al. | |
| 6,992,580 B2 | 1/2006 | Kotzin et al. | |
| 7,021,426 B2 | 4/2006 | Griffioen et al. | |
| 7,064,559 B2 | 6/2006 | Bissonnette et al. | |
| 7,151,878 B2 | 12/2006 | Sutehall et al. | |
| 7,209,028 B2 | 4/2007 | Boronkay et al. | |
| 7,225,533 B2 | 6/2007 | Sylvia et al. | |
| 7,408,474 B2 | 8/2008 | Frazier et al. | |
| 7,418,184 B1* | 8/2008 | Gonzales et al. | 385/135 |
| 7,562,861 B2 | 7/2009 | Fee et al. | |
| 7,942,382 B2 | 5/2011 | Lecoq et al. | |
| 8,117,923 B2 | 2/2012 | Sasaki | |
| 8,275,227 B2 | 9/2012 | Thurlow et al. | |
| 8,276,883 B2 | 10/2012 | Heatley et al. | |
| 8,350,581 B1 | 1/2013 | Brady et al. | |
| 2002/0034365 A1 | 3/2002 | Vogelsang | |
| 2002/0121440 A1 | 9/2002 | Morris | |
| 2002/0158239 A1 | 10/2002 | Griffioen et al. | |
| 2003/0001592 A1 | 1/2003 | Boronkay et al. | |
| 2003/0006669 A1 | 1/2003 | Pei et al. | |
| 2003/0222663 A1 | 12/2003 | Acosta-Geraldino et al. | |
| 2004/0135588 A1 | 7/2004 | Bissonnette et al. | |
| 2005/0073327 A1 | 4/2005 | Walcott | |
| 2006/0203086 A1 | 9/2006 | Pavlakovic | |
| 2006/0219992 A1 | 10/2006 | Fee et al. | |
| 2006/0275008 A1* | 12/2006 | Xin | 385/135 |
| 2007/0047894 A1 | 3/2007 | Holmberg et al. | |
| 2007/0104447 A1 | 5/2007 | Allen | |
| 2008/0011990 A1 | 1/2008 | Kostet et al. | |
| 2008/0013893 A1 | 1/2008 | Zheng et al. | |
| 2008/0013907 A1 | 1/2008 | Zumovitch et al. | |
| 2008/0050083 A1 | 2/2008 | Frazier et al. | |
| 2008/0205844 A1* | 8/2008 | Castonguay et al. | 385/135 |
| 2008/0267714 A1 | 10/2008 | Lecoq et al. | |
| 2009/0010606 A1 | 1/2009 | Thurlow et al. | |
| 2009/0026429 A1 | 1/2009 | Barker et al. | |
| 2009/0065547 A1 | 3/2009 | Heatley et al. | |
| 2009/0065753 A1 | 3/2009 | Gonen et al. | |
| 2009/0166597 A1 | 7/2009 | Weaver et al. | |
| 2010/0148138 A1 | 6/2010 | Baker et al. | |
| 2010/0155681 A1 | 6/2010 | Taylor et al. | |
| 2011/0006786 A1 | 1/2011 | Heatley et al. | |
| 2011/0062973 A1 | 3/2011 | Paterson | |
| 2011/0079027 A1 | 4/2011 | Ghan et al. | |
| 2011/0084244 A1 | 4/2011 | Heatley et al. | |
| 2011/0135267 A1 | 6/2011 | Barker et al. | |
| 2011/0178713 A1 | 7/2011 | Barker | |
| 2012/0023723 A1 | 2/2012 | Barker et al. | |
| 2012/0029846 A1 | 2/2012 | Heatley et al. | |

FOREIGN PATENT DOCUMENTS

| | | |
|---|---|---|
| DE | 10338950 | 6/2005 |
| EP | 108590 | 5/1984 |
| EP | 253636 | 1/1988 |
| EP | 0292037 | 11/1988 |
| EP | 0294243 | 12/1988 |
| EP | 0319194 | 6/1989 |
| EP | 1273902 | 1/2003 |
| EP | 1 333 303 A1 | 8/2003 |
| EP | 1 593 994 A2 | 11/2005 |
| EP | 1593994 | 11/2005 |
| EP | 1022569 | 7/2007 |
| EP | 1832903 | 9/2007 |
| EP | 1832908 | 9/2007 |
| EP | 1843181 | 10/2007 |
| EP | 2381283 A1 | 10/2011 |
| FR | 2737053 | 1/1997 |
| FR | 2872299 | 12/2005 |
| GB | 2073440 | 10/1981 |
| GB | 2219662 | 12/1989 |
| GB | 2 316 496 A | 2/1998 |
| GB | 2388966 | 11/2003 |
| JP | 5-328559 | 12/1993 |
| JP | 08163737 | 6/1996 |
| JP | 408178722 | 7/1996 |
| JP | 2000217216 | 8/2000 |
| JP | 4240806 | 3/2009 |
| SU | 1000750 | 2/1983 |
| WO | WO1988/00713 | 1/1988 |
| WO | WO91/03756 | 3/1991 |
| WO | WO95/23988 | 9/1995 |
| WO | WO98/12588 | 3/1998 |
| WO | WO99/12066 | 3/1999 |
| WO | WO2006/103419 | 10/2006 |
| WO | WO2006/103424 | 10/2006 |
| WO | WO2007/101975 | 9/2007 |
| WO | WO07104913 | 9/2007 |
| WO | WO09083715 | 9/2007 |
| WO | WO2007104910 | 9/2007 |
| WO | WO2007/113544 | 10/2007 |
| WO | WO2007/113549 | 10/2007 |
| WO | WO2007113519 | 10/2007 |
| WO | WO2008/119976 | 10/2008 |
| WO | WO2009/083722 | 7/2009 |
| WO | WO09083721 | 7/2009 |
| WO | WO 2009/131895 A2 | 10/2009 |
| WO | WO10004288 | 1/2010 |
| WO | WO10034970 | 4/2010 |

OTHER PUBLICATIONS

Draft Recommended Practices for Cable Installation in Generating Stations and Industrial Facilities, Jan. 2010. 94 pages.

International Search Report for International Application No. PCT/GB2007/003811 dated Jan. 11, 2008.

International Search Report for International Application No. PCT/GB2010/000487 dated Jul. 15, 2010.

International Search Report for International Application No. PCT/GB2008/004277 dated May 28, 2009.

International Search Report for International Application No. PCT/GB2008/004281 dated May 28, 2009.

International Search Report for International Application No. PCT/GB2009/002222 dated Feb. 4, 2010.

International Search Report for International Application No. PCT/GB2010/000635 dated May 6, 2011.

International Search Report for International Application No. PCT/GB2007/000455 dated March 28, 2007.

International Search Report for International Application No. PCT/GB2007/001216 dated Jul. 19, 2007.

Application and File History for U.S. Appl. No. 12/445,844, filed Apr. 16, 2009, inventors Taylor et al.

Application and File History for U.S. Appl. No. 12/810,731, filed Sep. 21, 2010, inventors Heatley et al.

Application and File History for U.S. Appl. No. 12/810,737, filed Dec. 21, 2010, inventors Heatley et al.

(56) References Cited

OTHER PUBLICATIONS

Application and File History for U.S. Appl. No. 13/120,124, filed Mar. 21, 2011, inventor Barker.
Application and File History for U.S. Appl. No. 13/260,105, filed Sep. 23, 2011, inventors Barker et al.
Application and File History for U.S. Appl. No. 13/257,440, filed Sep. 19, 2011, inventors Heatley et al.
Application and File History for U.S. Appl. No. 12/281,384, filed Sep. 2, 2008, inventors Thurlow et al.
Application and File History for U.S. Appl. No. 12/295,750, filed Oct. 2, 2008, inventors Baker et al.
FIST-GCO2-F, Flat FIST generic closure organizer, Tyco Electronics Raychem, Belgium, as available on Sep. 26, 2012, at http://www.te.com/content/dam/te/global/english/industries/telecom-emea/products/documents/fiber-closures/TC-1032-DS-5-09-11.pdf.
EPO Communication, EP Application No. 11711615.2-1504, dated Aug. 11, 2016, 5 pages.

* cited by examiner

OPTICAL FIBER APPARATUS

RELATED APPLICATIONS

The present application is a National Phase entry of PCT Application No. PCT/GB2011/000432, filed Mar. 25, 2011, which claims priority from Great Britain Patent Application No. 10250611.0, filed Mar. 26, 2010, the disclosures of which are hereby incorporated by reference herein in their entireties.

TECHNICAL FIELD

This invention relates to apparatus, systems and methods related to optical fiber, particularly but not exclusively in respect of optical fiber containers and trays.

BACKGROUND

Optical fiber is now well known and widely used as a transmission medium in the telecommunications field. Lengths of fiber may be joined together by e.g. splicing for various reasons, e.g. to span a certain distance, or to connect e.g. a fiber leading from the core network and a fiber of the access network. Spliced fiber are very fragile at the splice point, and are typically protected from stress and damage by placing the spliced sections in a splice case or container.

Often the container takes the form of a tray, which in addition to protecting one or more splices, usually further serves to store (excess) lengths of fiber. An optical fiber splice closure or enclosure (also known as a joint) allows for a number of splice trays to be deployed in a relatively small area. In a typical configuration within a closure, the trays are stacked together so that in a stored position the tray faces or bases are in or almost in contact with each other. This minimizes the space envelope occupied by the splice closure, which is a boon in an environment such as within a footway box or a street cabinet, which is an increasingly crowded space, especially with the movement of bringing fiber within the "last mile" ever closer to end-customers in the push to Fiber to the Home or such points within the access network (FTTx).

As expected, this push of fiber outwards to end-customers will dramatically increase the number of connections required especially in the access network. While it is possible to deploy another splice enclosure, the limited and decreasing space within the footway box or cabinet makes it desirable to increase the capacity of optical fiber splice enclosures used particularly in distribution points. It would be even more desirable if the solution did not involve any significant change to the current configurations and space envelopes of fiber splice closure joint. It would also be advantageous to make few changes to current, mature techniques of splicing and storing optical fiber using splice trays. Keeping current sizes and practices would avoid or reduce the need to reconfigure spaces and to learn new methods.

An example of a splice closure of the type referred to above is the FIST-GCO2-F sealed enclosure from Tyco Electronics Raychem N.V. of Belgium, whose website is located at www.tycoelectronics.com. This unit has a single element splicing capacity of 96 fibers on 8 trays, or 144 fibers on 12 trays. In this enclosure, trays are pivotably attached in a row to the main unit along a linear backplane which serves as a spine, as illustrated in FIG. 1 and discussed further below. This allows for the functional faces of the trays to be exposed for access when they need to be worked upon, and for them to be stored away in a stack, as will be discussed further below. The height or length of the backplane is a chief determinant of the capacity of the enclosure in that it puts a limit on the number of splice trays that may be contained in the joint.

Various other tray arrangements within such enclosures are known in the prior art. The storage enclosure of GB 2316496A describes a configuration in which a tray is hinged not to a backplane, but to an adjacent tray in a series. All the hinged points are located at substantially the same location on each tray, so the trays are (similar to the Tyco enclosure discussed above) attached to each other in a row. A variation of this configuration is described in U.S. Pat. No. 5,835,657, in which trays are also attached to adjacent trays in a row. Attaching trays to each other in a series in the ways described in these two pieces of prior art wherein the attachment points are disposed in a row, are therefore functionally identical or very similar to attaching trays along a backplane or central spine. Yet another arrangement is described in EP 1333303 comprising a pair of splice trays, which are nested within each other. The outer tray is attached to the backplane, and the inner tray is attached to the outer tray in a way so that both pivot in the same direction to allow access to the working surfaces of the trays.

A problem suffered by prior art tray enclosures stacked vertically along a linear backplane is that to access a particular tray, not all the trays are easily accessible, especially the ones further removed from a user's reach or sight e.g. the highest or lowest trays in the stack. Furthermore, access to the desired tray requires that those trays which are not being worked, to be stowed or secured out of the way, which requires additional components or elements, and usually involves at least one additional step in the splicing process. Because of the sheer scale of a FTTx undertaking, these all add up to significant amounts of cost and time. It would be desirable to reduce and to simplify the process of providing splices and to save time and cost in doing so.

SUMMARY

In embodiments, there is provided an optical fiber splice tray assembly comprising primary tray having a primary splice working surface moveably attached to a backplane by primary attachment means, a secondary tray having a secondary splice working surface which is moveably attached to the primary tray by secondary attachment means located in a position on the primary tray remote from the backplane, the secondary attachment means being configured to enable the secondary tray to move between a first position in which the working surface of the primary tray is exposed, and a second position in which the working surface of the primary tray is substantially covered by the secondary tray, wherein during use of the working surface of the secondary tray, the working surface of the secondary tray faces substantially the same direction as the working surface of the primary tray.

The second or subsequent secondary tray is attached to the first, primary tray in the place tray or splice tray assembly. In a first, closed, position, the secondary or second tray covers the working surface or base of the first or primary tray. In order to access the primary tray, the secondary tray is swiveled or pivoted upwards and away to expose the face of the primary tray underneath in a second, open position. In the second position, the moved tray assumes a position in which it is tipped away from the primary tray under the influence of gravity. This avoids the need for separate securing means to expose the primary tray face. In some applications, the secondary tray hangs substantially downwards from the edge of the primary tray from a location diametrically opposite to where the primary tray is hinged to the backplane of the fiber enclosure.

The applicants have realized that space within a splice tray can be used to accommodate a further tray(s), by reducing the clearance between the areas which store the fiber and the splices. However, as attaching additional trays (however slim they are) to the backplane takes up considerable area on the backplane, such additional trays are advantageously attached to the primary tray instead. This realizes the full potential of increasing the capacity of a splice joint box by at least 100%, by the expedient of attaching at least one second tray to every primary tray attached to the backplane of the splice enclosure. These second, secondary, tray(s) advantageously do not take up any space on the backplane, but instead occupy otherwise "dead" space within those trays which are (already) attached to the backplane. Hence they can potentially be attached to any part of the first, primary, tray, as long as they are not attached to and take up room on the backplane (which may be actual or notional, as described further below).

In embodiments, there is provided an optical fiber splice tray for use as a secondary tray with a primary tray to form an optical fiber splice tray assembly, wherein the secondary attachment means of the optical fiber splice tray is configured to be moveably attached to the primary tray so that during use of the working surface of the optical fiber splice tray, the working surface of the optical fiber splice tray faces substantially the same direction as the working surface of the primary tray.

A splice tray can be provided for use as a secondary tray for attachment to primary splice trays. Such secondary splice trays can be retrofitted to primary splice trays already deployed within splice closures, or else be attached to the primary tray prior to deployment of the resulting tray assembly within a splice enclosure.

In embodiments, there is provided an optical fiber splice enclosure comprising a backplane for attaching a plurality of optical fiber splice trays to, including at least one optical fiber splice tray assembly which are attached to the backplane.

In embodiments, there is provided an optical fiber splitter enclosure comprising a backplane for attaching a plurality of optical fiber splice trays to, including at least one optical fiber splice tray assembly which are attached to the backplane.

The optical fiber tray assembly can be used in a variety of enclosures, such as those deployed in distribution points, splitter nodes and aggregation points.

In embodiments, there is provided a method of accommodating a plurality of optical fiber splices using an optical fiber splice tray assembly, comprising while the secondary tray is in the first position: accommodating one or more of the plurality of fiber splices in the primary tray using fiber splice accommodation means, and storing optical fiber on the primary tray using fiber retention means, moving the secondary tray to the second position to face substantially the same direction as the working surface of the primary tray, and while in the second position: accommodating one or more of the plurality of fiber splices in the secondary tray using fiber splice accommodation means, and storing optical fiber on the secondary tray using fiber retention means.

BRIEF DESCRIPTION OF THE DRAWINGS

Embodiments of the invention will now be described by way of example only with reference to the accompanying drawings in which.

DETAILED DESCRIPTION

Figure 1:
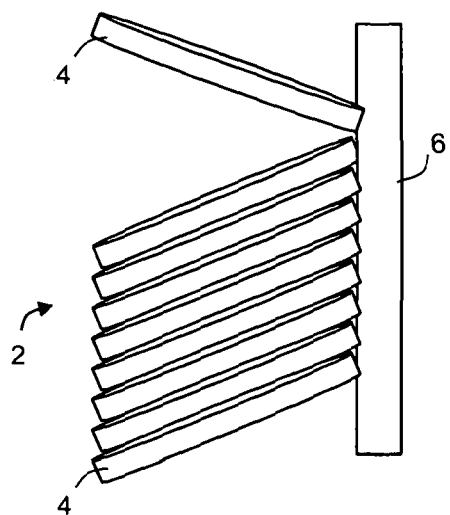
FIG. 1 is a schematic sidewards depiction of a number of splice trays deployed within a fiber splice closure.

FIG. 1 is a schematic view of the configuration of an optical fiber splice enclosure (2). In this embodiment, a number of trays (4) are pivotably connected to a substantially linear spine or a backplane (6) so the trays align or stack alongside each other along a line so that, save for the top-most tray, the base is not accessible when the trays are in a stored position as shown by the lower trays in FIG. 1. When in use (i.e. when the trays are being worked on) the backplane takes a substantially vertical position. During storage, the enclosure is turned though about 90 degrees so that the backplane assumes a horizontal position. References to the position of the enclosure, backplane and trays herein generally refer to the working position, unless indicated otherwise. The manner in which they are hinged to the backplane allow for the trays to be pivoted in a direction which is parallel to the linear axis of the backplane. For example, the uppermost tray in FIG. 1 is shown to be pivoted upwards, so that in this instance, the base of the second tray down is accessible to a user. To keep the uppermost tray in its elevated position within the vertical stack, the hinges can be profiled with slots enabling the tray to stay in place. Alternatively, a device consisting of a wire can be used to maintain the tray's position. The splice enclosure shown in this figure depicts an arrangement in which the trays are stacked vertically (as is the case with the above-discussed enclosure from Tyco Electronics), but other configurations such as horizontal stacks are known in the field.

The typical splice tray of the prior art deployed in conventional splice enclosures comprises a substantially flat face or base against which optical fiber is held into place by lodging sections of the fiber under retention tabs which extend from the base. Doing so serves to ensure that the fiber, which is naturally resilient, does not "spring" out of position, and further ensures that the minimum bend radius of the fiber is respected. The splice tray further includes a section which encases the spliced section of the fiber. The elements and configuration of splice trays will be further described in connection with FIGS. 2 and 3, which depict trays according to various embodiments.

Figure 2:
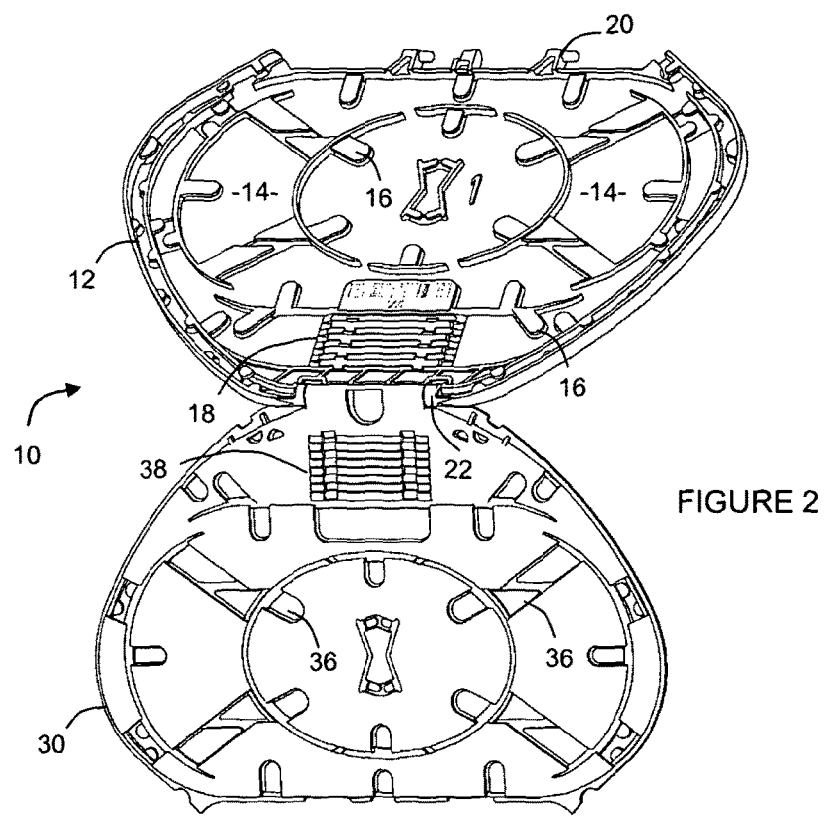
FIG. 2 is a depiction of a splice tray assembly in a first position.

FIG. 2 shows a splice tray or splice tray assembly (10) in a first position in which the base of a first tray (12) is accessible to a user. This exposed tray is numbered "1" in the drawing, is one of a pair of trays, and is here referred to as the first, or primary, tray. This view shows the working or functional surface of the tray, on which surface an operative can create splices and store them, as well as store any excess optical fiber. It comprises a substantially flat face or base (14) against which optical fiber is positioned and stored by pushing sections under tabs (16) which stand upwardly from the base of the splice tray. During use, the fiber is threaded through access holes in the tray, and wound around the path defined by the positions of the retention tabs which determine the minimum bend that may be taken by the fiber. Pinning the fiber down in this manner within the tray further serves to protect the splice, by isolating it from movement on and along both sides of the fiber leading up to the splice.

The spliced section of the fiber is protected in a grooved section of the tray serving as splice protection holders (18). There are four splice protection holders shown in this drawing. Typically the splice is further encased in a sleeve which is shrunk around the splice using heat, which reduces the chances of disruption to the join even further. In the exemplary trays shown in FIGS. 2 and 3, four splices (and a corresponding amount of fiber) can be accommodated on each single tray.

Hinges (20) serve to pivotably attach the splice tray to the backplane (6) of a splice closure in the manner discussed above in connection with FIG. 1. It would be understood that throughout the description, these hinges (20) can also serve for attachment to an adjacent tray in a row forming or virtual or notional backplane in the enclosure, where there is no actual physical backplane as such. These hinges are located at the back of the tray, as oriented by reference to a user such as an engineer or other operative who is arranging the fiber within the tray. In other words, the attachment or connection to the back plane is provided at a location on the splice tray, which is on the opposite side according to the perspective of a party using the tray. The trays are constrained to pivot or swivel about the hinge within a plane and in a direction which is substantially parallel to the long axis of the backplane, i.e. upwardly and downwardly, when the backplane is in its working, vertical, position.

A tray lid (not shown) can be provided to provide further protection to the spliced fiber against damage within the tray stack, for example, in the instance where the fiber may have escaped its confines from under the tabs.

The first tray numbered "1" as described and depicted in FIG. 1 broadly accords with the configuration of conventional fiber splice trays, and the embodiment of the first tray as shown may be thought to be substantially identical to such prior art splice trays. The splice tray assembly (10) includes a second tray (30) which is attached to the first via a second hinge (22). In the embodiment shown in the drawings, the second hinge point lies in the front of the tray assembly (in accordance to the orientation of a user of the tray), i.e. in a position diametrically opposite to the first hinge point (20).

The view of the second, secondary, tray (30) in FIG. 2 is not the functional surface or base against which fiber is directed, wound, and stored, but of the rear of that surface. This second tray includes a working surface with the features discussed in connection with the first tray above, which allows for spliced fiber and optical fiber to be stored. The perspective in FIG. 2 affords a "negative" view of the tabs (26) and the splice protection grooves (38) wherein, for example, the "negative" view depicts a concave section which on the functional side of the second tray is a convex element. Thus the tabs (36) of the second tray are configured so that the projections extending upwardly from the opposite, functional side of the tray base, is shown to be hollows on the bottom side shown in FIG. 2. This allows the first and second trays to be very closely stacked on top of each other, as will be further described below.

In the position shown in FIG. 2, the tray assembly is in an "open" configuration or position, to allow a user access to work on the working or operative base (14) of the first tray numbered "1". In this view of the tray assembly during use, the second tray hangs downwardly from the second hinge (22) of the first, primary tray. There is no need for the second tray to be separately secured to enable exposure of the first tray base, as the second tray simply hangs away from the lip of the first tray. In this arrangement, there is no risk of the unsecured secondary tray falling back onto the base of the first tray while that is being worked upon.

As may be expected, the location of the second hinge (22) on the first tray determines the manner and direction in which the second tray pivots relative to the first tray. In the embodiment under discussion where the second pivoting hinge point (22) is located diametrically opposite the first hinge (20), the second tray moves to and from its resting position on top of and covering the base (14) of the first tray, by pivoting about that hinge point which is located on the front lip or periphery of the first tray (from the perspective of the user working on the trays).

Figure 3:
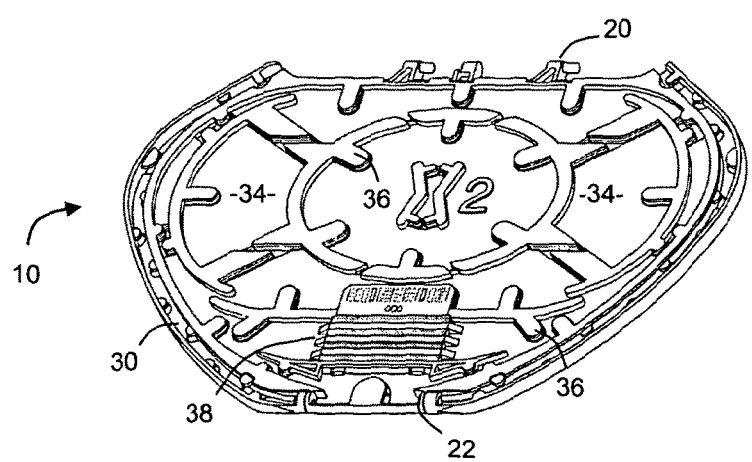
FIG. 3 is a depiction of a splice tray assembly in a second position.

FIG. 3 depicts the splice tray assembly (10) of the invention in a second position, which allows a user access to the working or operational face or surface of the tray base (34) of the second tray (numbered "2" in the drawing). As noted earlier, the configuration of the second tray is almost identical to the first tray, which working surface is now substantially covered by the second tray. It too, is capable of accommodating a number of splices (four, in the embodiment shown in the drawing) in the splice protection area (38), and of storing fiber against the tray base (34) by retention under a plurality of tabs (36).

In the embodiment shown in the drawings, the footprint of the second tray is slightly smaller than that of the first tray. This allows the second tray to nest within the rim or lip of the first tray and thus for the two trays making up the tray assembly to occupy essentially the same space as a tray of the prior art. The very close stack created when the second tray is closed onto the first (as shown in FIG. 3) helps to essentially double the capacity of a splice tray within the same space envelope of a conventional splice tray.

Figure 4:
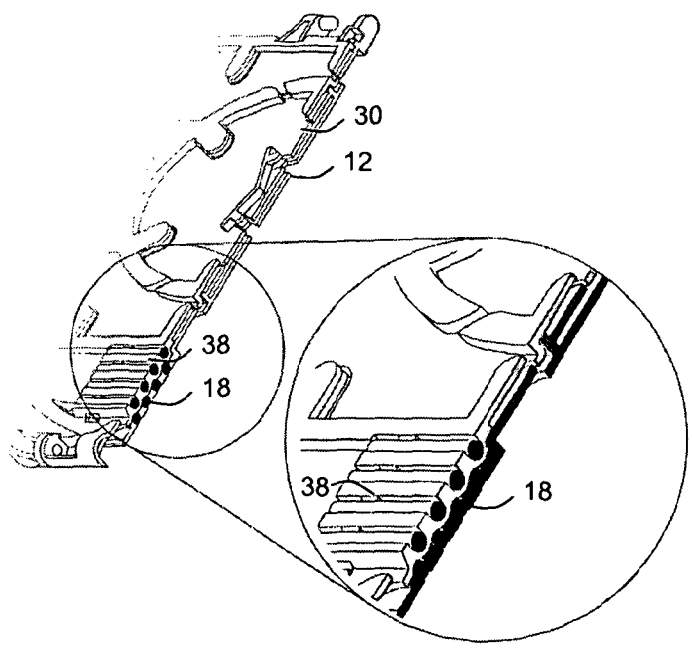
FIG. 4 is a detailed cross sectional view of a part of the splice tray assembly.

To accommodate the fiber and splices, as well the features of the first tray, the rear side of the second tray (seen in FIG. 2) is provided with hollows and spaces coincident to the presence of projections from the base of the first tray, as discussed above. FIG. 4 illustrates this. The splice tray (10) is depicted in its second position in which the second tray (30) is folded over the first tray (12). As shown, the respective splice protection sections (18 and 38) are, on this position, configured so that the grooves of the respective sections are located just offset from each other, so that the concave sections of the underside of the second tray (30) can accommodate and allow the heat-shrink tubes of the first tray (12) to nest within.

The advantage of increased capacity is realized primarily through the deployment of a second or subsequent tray attached to the first, primary tray, but not to the spine or backplane of the splice closure. Nor are the hinge points of the second or subsequent trays arranged so that in use they fall into a row or line described by the hinge locations of the first, primary, trays attaching them to the backplane of the enclosure (this being functionally equivalent to attaching all the trays, primary or otherwise, to a backplane). In this way, no valuable backplane space is taken up. Instead, extra splice tray capacity is "stolen" as it were from the space within the existing primary trays which are already directly attached to the backplane, by reducing the clearance height between trays. The second trays are therefore only indirectly attached within the enclosure to the backplane (actual or notional) via the first tray.

Advantageously, this configuration allows for a very tight stacking arrangement to be achieved, which in an embodiment is a nest of trays taking up the same or very little more space than a conventional splice tray. It also allows for more trays to be deployed on the same backplane, without need to increase its height or length, or to otherwise increase the size of the splice enclosure. In the embodiment shown in the drawings, the capacity of the enclosure can be doubled with no significant space increase required.

The apparatus, methods and configurations as described above and in the drawings are for ease of description only and not meant to restrict the apparatus or methods to a particular arrangement or process in use. As noted above, the methods and apparatus described are merely exemplary and the skilled person would appreciate that a number of alternatives exist to implement aspects of the invention.

For example, while a pivoting attachment is used in an embodiment for the second hinge allowing the second tray to be moved into the second position to expose its working surface, the trays can also be moved relative to each other by using a rotary swivel or linear sliding attachment so that the second tray can be swiveled, or slid sideways, to expose the working surface of the first tray underneath.

Figure 5:
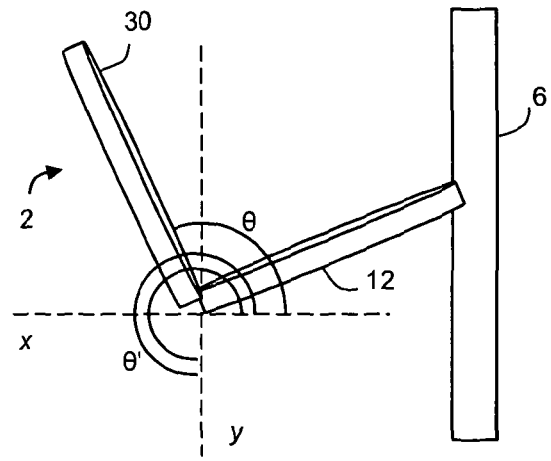
FIG. 5 is a schematic depiction of the second tray of the splice tray assembly in an open position.

Also, the second hinge attaching the trays to each other need not be located diametrically opposite the first hinge, which attaches the first, primary tray to the splice enclosure. The hinge could be located at any point along or near to the rim of the first tray as long as there is enough clearance between trays in the stack to allow it to be swung clear and to expose the working surface or base of first tray. As the skilled person would realize, it is not necessary to ensure that the second tray hangs absolutely orthogonally to the ground surface in the manner shown in FIG. 2. The advantages of the invention can be realized as long as the second tray is angled away from the first tray sufficiently so that it tips away under the influence of gravity. As schematically depicted in FIG. 5, any position of the second tray in its open position which describes an angle greater than 90 degrees to the normal of the ground surface (as represented by axis y) would "over-centre" the tray so that it tips away from the first tray, as exemplified by angle θ (relative to the ground surface (depicted by axis x) away from the first tray in FIG. 5. Another example is the manner in which the second tray hangs downwardly in FIG. 2 (i.e. substantially parallel to axis y of FIG. 5 and represented by angle θ'). References "to hang away" or "to hang downwardly" herein and in the claims should be construed to include such possibilities in that by hanging the second tray, it need not be separately secured or supported to expose the tray base below. Within the range of possibilities the hanging arrangement shown in FIG. 2 is most preferred for enabling the user easy access to the first, upper tray which at the same time requires no securing.

Also, in an embodiment, the second hinge can be located at any position which does not effectively use any of the space along the backplane or spine of the enclosure. For example, it can be possible to locate the second hinge (22) at the same location as the first attachment hinge so that both trays swivel within the same plane and in the same direction (i.e. parallel to the backplane), as long as it does not actually occupy any space on the physical or functional backplane or spine. In such an implementation, an attachment to allow trays to pivot in the same direction as the first pivoting hinge might hinder use of the tray assembly in that the second tray will have to be separately secured to expose the first tray base for the duration that access to the first tray base is needed. In other embodiments, use of a second tray which can be slid away to expose the functional surface of the first tray can be employed instead.

Where circumstance permit, a number of secondary trays (i.e. more than one) could be nested each into the next: increased spliced fiber capacity per unit of space can be achieved even if such an arrangement ultimately proves to be larger than a single conventional splice tray. It is also not necessary for the trays to fully nest into each other in the sense that the secondary tray(s) all fold into the rim or lip of the next tray, as two trays having the same substantial footprint may stack against each other in a way which nonetheless ensures a close fit between trays.

The working side of the second and/or subsequent trays need not be located on any particular side of the tray base. In the embodiment shown in the drawings in which the trays are pivotally attached to each other, the location of the operational face is depicted as this allows the user to work on an upward-facing surface, but this is not essential. If however the trays are attached slideably or by a swiveling hinge, the working surface of the second tray(s) can be located on the same side as the first, primary tray, although again this is not essential.

Embodiments can be also be used in a wide variety of applications and contexts, wherever the need for increased capacity is required within substantially the same space. For example, such a tray arrangement can be deployed also in splitter nodes or enclosures, aggregation points and the like, as well as in distribution points within the access network. It will also be apparent to the skilled person that various sequences and permutations on the methods and apparatus described are possible within the scope of this invention as disclosed.

The invention claimed is:

1. An optical fiber splice tray assembly comprising:
   a primary tray having a primary optical fiber splice working surface configured to receive one or more optical fiber splices; and
   a secondary tray having a secondary optical fiber splice working surface configured to receive one or more optical fiber splices;
   primary attachment means for moveably attaching the first tray to a backplane, the primary attachment means being configured to enable the primary tray to pivot about a first axis; and
   secondary attachment means moveably attaching the primary tray to the secondary tray, the primary attachment means being located in a position at a rear of the primary tray and the secondary attachment means being located in a position at a front of the primary tray, the secondary attachment means being configured to enable the secondary tray to pivot about a second axis parallel to and spaced apart from the first axis such that the secondary tray is movable between
   a first position in which the primary optical fiber splice working surface is exposed, and
   a second position in which the secondary optical fiber splice working surface is exposed and the primary optical fiber splice working surface is substantially covered by the secondary tray nested within the primary tray, the second tray being smaller than the primary tray.

2. An optical fiber splice tray assembly according to claim 1, wherein, during use, the secondary tray hangs downwardly from the primary tray in the first position.

3. An optical fiber splice tray assembly according to claim 1, wherein the primary optical fiber splice working surface of the primary tray includes a lip along an edge, and wherein the secondary tray is configured to be nested substantially within the edge and height of the lip in the second position.

4. An optical fiber splice tray assembly according to claim 1, wherein the primary optical fiber splice working surface includes fiber retention means and fiber splice accommodation means, and wherein the fiber retention means and the fiber splice accommodation means are configured to accommodate the secondary tray when in the second position.

5. An optical fiber splice tray assembly according to claim 4, wherein the fiber splice accommodation means comprises one or more grooves on each of the optical fiber splice working surfaces of the primary and secondary trays, and wherein the grooves of the secondary tray are configured to nest in an offset position to the grooves of the primary tray.

6. An optical fiber splice tray for use as a secondary tray with a primary tray to form an optical fiber splice tray assembly, the assembly comprising:
the primary tray having a primary optical fiber splice working surface configured to receive one or more optical fiber splices;
the secondary tray having a secondary optical fiber splice working surface configured to receive one or more optical fiber splices;
primary attachment means for moveably attaching the first tray to a backplane, the primary attachment means being configured to enable the primary tray to pivot about a first axis; and
secondary attachment means moveably attaching the primary tray to the secondary tray, the primary attachment means being located in a position at a rear of the primary tray and the secondary attachment means being located in a position at the front of the primary tray, the secondary attachment means being configured to enable the secondary tray to pivot about a second axis parallel to and spaced apart from the first axis such that the secondary tray is movable between
a first position in which the primary optical fiber splice working surface is exposed, and
a second position in which the secondary optical fiber splice working surface is exposed and the primary optical fiber splice working surface is substantially covered by the secondary tray nested within the primary tray, the secondary tray being smaller than the primary tray.

7. A method of accommodating a plurality of optical fiber splices using an optical fiber splice tray assembly, the assembly comprising a primary tray having a primary optical fiber splice working surface configured to receive one or more optical fiber splices, a secondary tray having a secondary optical fiber splice working surface configured to receive one or more optical fiber splices, primary attachment means for moveably attaching the first tray to a backplane, the primary attachment means being configured to enable the primary tray to pivot about a first axis, and secondary attachment means for moveably attaching the primary tray to the secondary tray, the primary attachment means being located in a position at a rear of the primary tray and the secondary attachment means being located in a position at the front of the primary tray, the secondary attachment means being configured to enable the secondary tray to pivot about a second axis parallel to and spaced apart from the first axis such that the secondary tray is movable between a first position in which the primary optical fiber splice working surface is exposed, and a second position in which the secondary optical fiber splice working surface is exposed and the primary optical fiber splice working surface is substantially covered by the secondary tray nested within the primary tray, the secondary tray being smaller than the primary tray, the method comprising:
moving the secondary tray to the first position to hang away from the primary tray, and while the secondary tray is in the first position:
accommodating one or more of the plurality of fiber splices in the primary tray using fiber splice accommodation means, and
storing optical fiber on the primary tray using fiber retention means; and
moving the secondary tray to the second position to face substantially the same direction as the working surface of the primary tray, and while in the second position:
accommodating one or more of the plurality of fiber splices in the secondary tray using fiber splice accommodation means, and
storing optical fiber on the secondary tray using fiber retention means.

* * * * *

UNITED STATES PATENT AND TRADEMARK OFFICE
CERTIFICATE OF CORRECTION

PATENT NO. : 10,247,896 B2
APPLICATION NO. : 13/637613
DATED : April 2, 2019
INVENTOR(S) : Kerry et al.

Page 1 of 1

It is certified that error appears in the above-identified patent and that said Letters Patent is hereby corrected as shown below:

In the Claims

Column no: 08, Line(s): 31, Claim 1: delete "and"

Column no: 08, Line(s): 35-36, Claim 1: "the first tray" to read as -- the primary tray --

Column no: 08, Line(s): 54, Claim 1: "the second tray" to read as -- the secondary tray --

Column no: 09, Line(s): 18-19, Claim 6: "the first tray" to read as -- the primary tray --

Column no: 09, Line(s): 26, Claim 6: "at the front" to read as -- at a front --

Column no: 10, Line(s): 06, Claim 7: "the first tray" to read as -- the primary tray --

Column no: 10, Line(s): 12-13, Claim 7: "at the front" to read as -- at a front --

Signed and Sealed this
Twelfth Day of November, 2019

Andrei Iancu
*Director of the United States Patent and Trademark Office*